Dec. 10, 1929.    H. J. EDWARDS ET AL    1,738,877
ENGINE BALANCER
Original Filed May 23, 1924    2 Sheets-Sheet 1
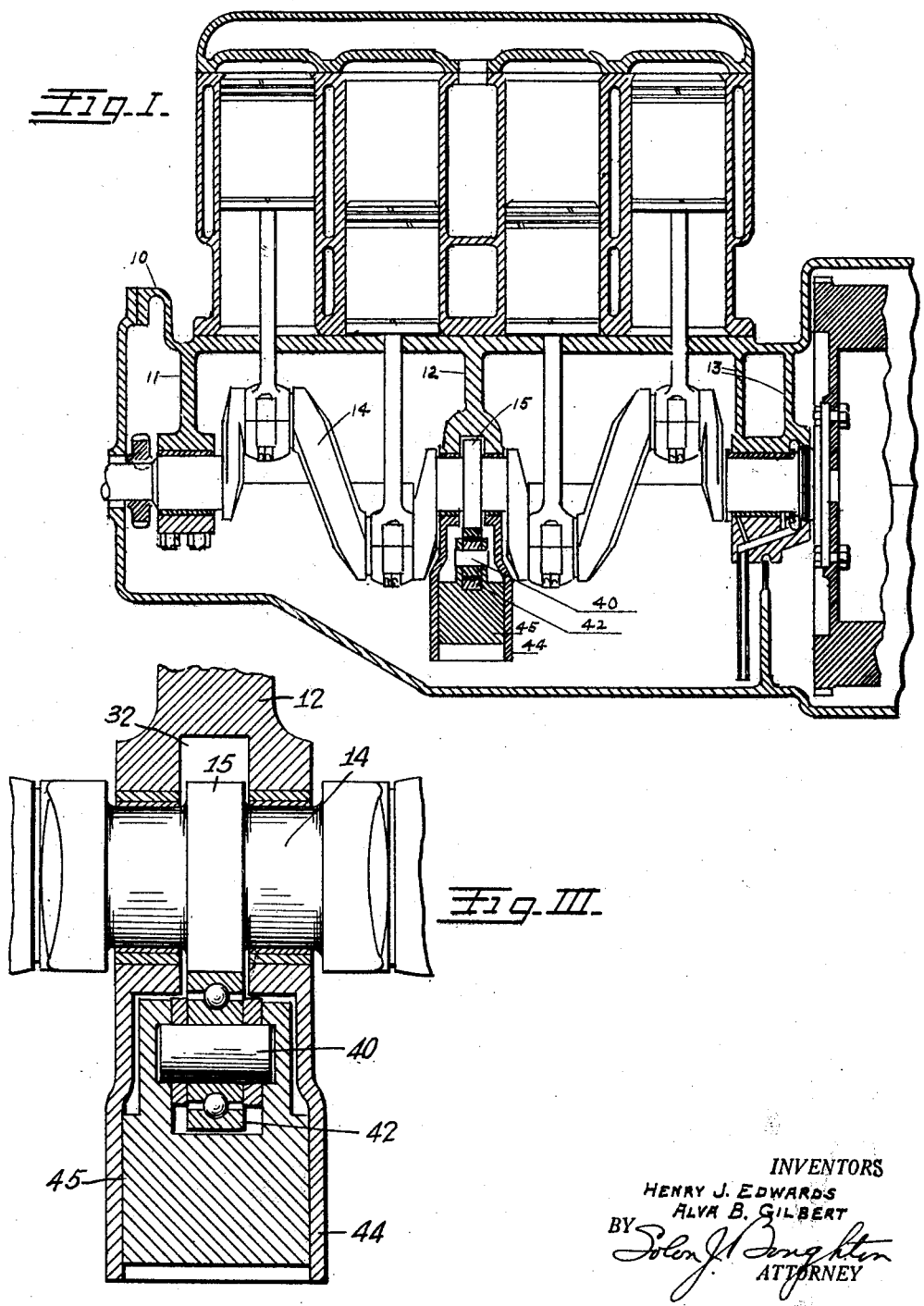
Fig. I.
Fig. III.
INVENTORS
HENRY J. EDWARDS
ALVA B. GILBERT
BY
ATTORNEY

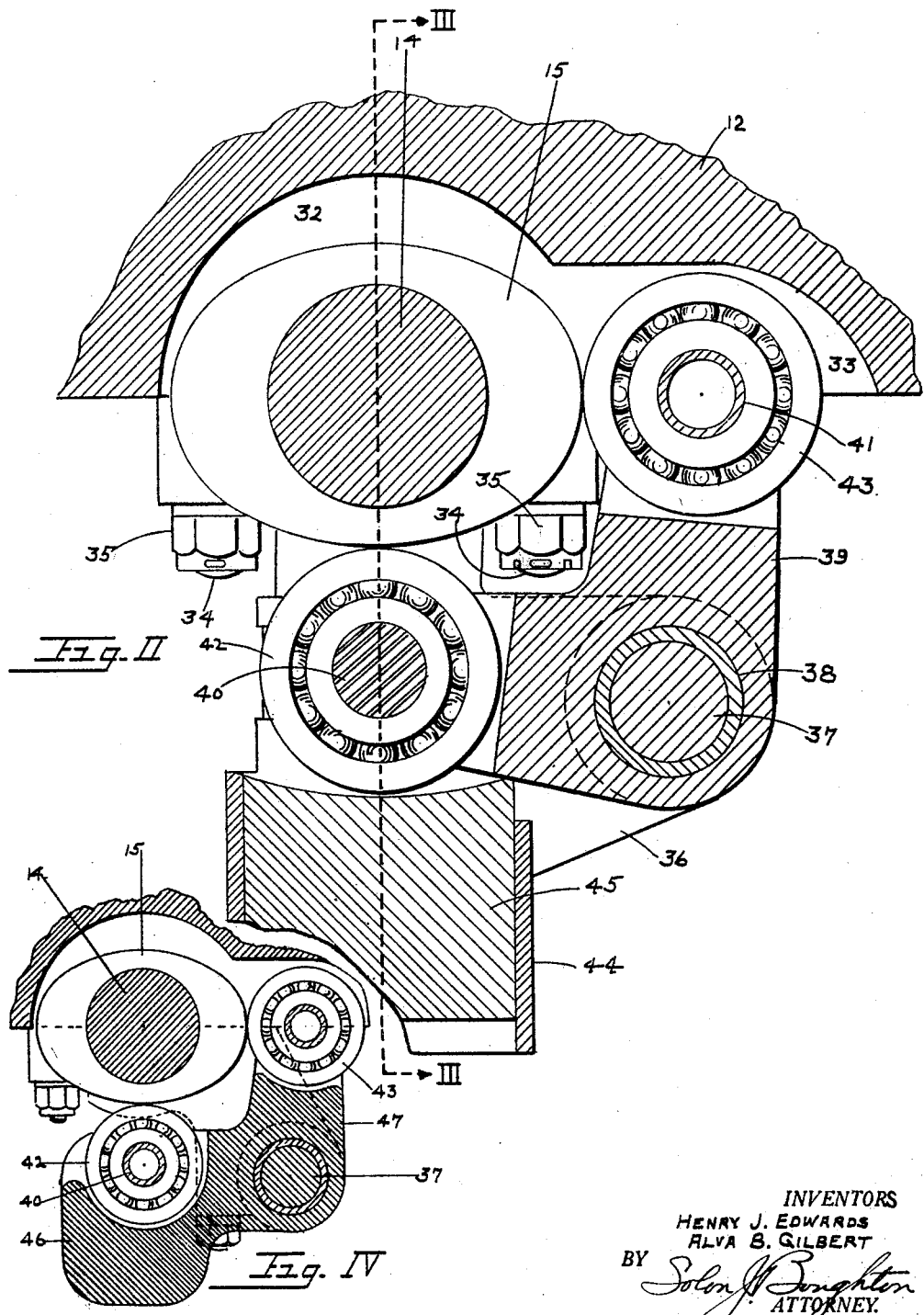

Patented Dec. 10, 1929

1,738,877

UNITED STATES PATENT OFFICE

HENRY J. EDWARDS, OF ELYRIA, AND ALVA B. GILBERT, OF CLEVELAND, OHIO, ASSIGNORS TO THE WILLYS-OVERLAND COMPANY, OF TOLEDO, OHIO, A CORPORATION OF OHIO

ENGINE BALANCER

Original application filed May 23, 1924, Serial No. 715,348. Divided and this application filed October 3, 1925. Serial No. 60,171.

This invention relates to improvements in engine balancers and has particular reference to that class of balancers which are designed to counteract the vibrations induced in engines by secondary inertia forces. This application is a division of copending application Serial Number 715,348 filed May 23, 1924, and has for one of its objects the provision of a balancer in which all movements are produced mechanically.

Another object of the invention is to provide a balancer of the class described, in which both upward and downward movements of the balance weight are produced by cam movements.

A further object of the invention is to provide a balancer, in which the balance weight movements are independent of springs or other resilient means.

Other objects relating to details of construction and economies of manufacture will appear as we proceed with the description to follow, which, for the purpose of the present application we have illustrated in the accompanying drawings, in which:

Fig. I is a central longitudinal vertical section through an engine embodying one form of our invention.

Fig. II is a transverse section taken at the central main bearing of an engine and showing the relative positions of the balancer mechanism.

Fig. III is a vertical longitudinal sectional view taken substantially on the line III—III of Fig. II.

Fig. IV is a view similar to Fig. II but showing a modification in which the weight is rigid with the bell crank lever.

Similar reference characters refer to like parts throughout the several views.

In Fig. I there is illustrated an internal combustion engine having a crankcase 10, the upper half of which is provided with integral transverse webs 11, 12 and 13, in which are located the front, center and rear bearings, respectively for a crankshaft 14. The engine illustrated is one having four cylinders, but the application of the invention extends also to certain other types as indicated in the copending application of Alva B. Gilbert, Serial Number 706,099, filed April 12th, 1924.

The center bearing of the crankshaft is split and the crankshaft is provided with a preferably integral cam 15 which occupies most of the space between the two parts of the bearing. This cam is shaped as shown in Figs. II and IV. The balancer is preferably located at the center bearing of the engine, the crankcase web 12 being cut away as indicated at 32 and 33 to accommodate the cam and one of the followers. Formed integral with the bearing cap and supported by the same studs 34 and nuts 35, is a bracket 36 carrying a pivot 37 upon which is mounted, through the intermediacy of a bushing 38, a bell crank 39, bifurcated at its two ends. Bridging the bifurcations are pins 40 and 41 carrying ball bearings 42 and 43 respectively, both of which contact at the same time with cam 15. The bracket 36 carries a cylinder 44, preferably made integral with the bracket. The cylinder constitutes the guide for a weight 45 which is pivotally hung upon pin 40 with sufficient lateral freedom to prevent weight 45 from being cramped in the guide 44, by the rocking movement of pin 40.

In the modification of Fig. IV, the weight 46 is an integral part of bell crank 47, being recessed to receive the ball bearing follower 42, which is supported as before upon a pin 40, which in this case is shown as hollow.

During the operation of the balancer both of the followers 42 and 43 remain in contact with the cam 15 throughout all of its positions. When one of the high spots is in contact with the follower 43, as is the case in Figs. II and IV, the bell crank is moved clockwise on its pivot 37 and the weight is raised. When, however, one of the high spots engages the follower 42, the bell crank is moved counterclockwise to the limit of its motion and the weight is depressed. The weight makes two complete reciprocations for each revolution of the crankshaft because of the two-high-spot cam integrally connected thereto and therefore has inertia forces of the same frequency as the secondary inertia forces of the engine.

We claim as our invention:

1. In a reciprocating engine, a crankshaft, a symmetrical cam with two high spots carried by the crankshaft, a bell crank lever pivoted near said cam, a cam follower on each arm of the bell crank, both followers contacting with the cam at points separated by an angle of 90°, and one of said arms having connection with a counterbalancing weight.

2. In a reciprocating engine, a crankshaft, a symmetrical cam with two high spots carried by the crankshaft, a weight mounted to reciprocate in a direction substantially parallel to the axes of the engine cylinders; a pair of followers arranged to co-operate with said cam and operatively connected with said weight, the cam having high spots acting upon one follower to raise the weight and upon the other follower to depress the weight.

3. In a reciprocating engine, a crankshaft having a cam with two high spots thereon, a bell crank pivotally mounted near said cam, said bell crank having arms contacting with said cam at two points thereon and a weight adapted to be reciprocated by said bell crank.

4. In a reciprocating engine, a cam with two high spots, said cam being driven at engine speed, a weight mounted to reciprocate in a direction substantially parallel to the axes of the engine cylinders, a pair of followers arranged to co-operate with said cam and operatively connected with said weight and said cam being adapted to have the high spots act upon one follower to raise the weight and upon the other follower to depress the weight.

5. In a reciprocating engine, a cam with two high spots driven at engine speed, a bell crank pivotally mounted in spaced relation to said cam, said bell crank having arms adapted to simultaneously contact with said cam in any of its rotative positions, and a balance weight adapted to be reciprocated by said bell crank.

6. In a reciprocating engine, a cam with two high spots driven at engine speed, a bell crank pivotally mounted adjacent said cam, said bell crank having two arms contacting with said cam at points separated by 90 degrees, and a weight adapted to be reciprocated by said bell crank in a direction substantially parallel to the engine cylinders.

7. In an engine, in combination, a plurality of cylinders, pistons reciprocally mounted in said cylinders, a crank shaft, connecting links connected to said pistons and said crank shaft, the arrangement being such that the center of the combined mass of the pistons and connecting links has a vibratory movement, a weight, a pair of oppositely extending cams on said crank shaft for moving said weight upwardly twice during each revolution of said crank shaft, and means for moving said weight downwardly twice during each revolution of said shaft.

8. Means for counterbalancing the secondary unbalanced forces in an internal combustion engine comprising the combination with a piston and cylinder therefor, a crank and connecting rod between the piston and crank, comprising a rotatable cam and a pivoted weighted lever riding on the cam, the cam and lever being so arranged that the weight is raised and lowered during each time the piston is passing through its intermediate position.

In testimony whereof, we affix our signatures.

HENRY J. EDWARDS.
ALVA B. GILBERT.